Dec. 5, 1933.  W. E. McDONNELL ET AL  1,937,903
EYEGLASS OR SPECTACLE MOUNTING
Filed March 30, 1931

WITNESS
H. L. Meade.

INVENTORS
William E. McDonnell
BY Roman J. Groh Jr.
Denison & Thompson
ATTORNEYS Patented Dec. 5, 1933

1,937,903

UNITED STATES PATENT OFFICE 1,937,903

EYEGLASS OR SPECTACLE MOUNTING

William E. McDonnell and Roman J. Groh, Jr., Rochester, N. Y., assignors to Shuron Optical Company, Inc., Geneva, N. Y., a corporation of New York Application March 30, 1931. Serial No. 526,316

2 Claims. (Cl. 88—48)

This invention relates to certain new and useful improvements in eye-glass or spectacle mountings and pertains specifically to a mounting for a rocking nose pad.

Although it is desirable to so construct a mounting that the nose pads may have limited rocking movement in a lengthwise direction, any accompanying lateral rocking movement is undesirable, and considerable difficulty has been experienced due to the failure of present constructions to provide for lengthwise rocking movement that can be readily adjusted and limited to the desired extent while avoiding lateral rocking movement of the pad.

Further, in present constructions, when a pad is damaged or destroyed, it is difficult and, in many cases, practically impossible to remove the pad without damaging its mounting or securing means to such an extent that it is at least difficult, if not impossible, to attach a new pad.

The main object of the present invention, is to provide a practical, economical structure of pad mounting, avoiding the difficulties inherent in present known constructions.

Other objects and advantages relate to the details of the structure and the form and relation of the parts thereof, all as will more fully appear from the following description, taken in connection with the accompanying drawing in which:—

Figure 1:
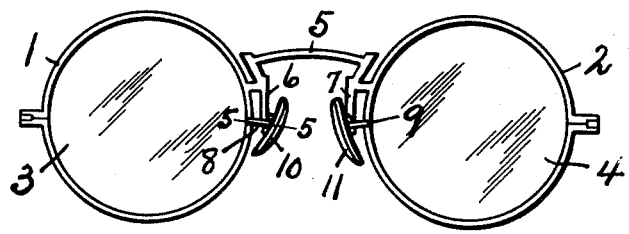
Figure 1 is a rear elevation of a mounting of this invention.
Figure 2:
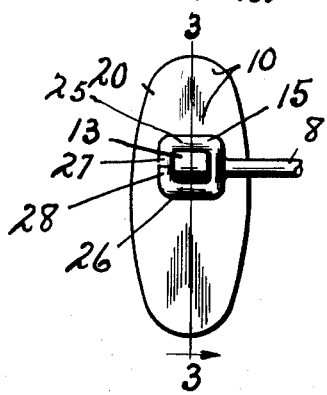
Figure 2 is a rear view of one of the pads with its mounting means.
Figure 3:
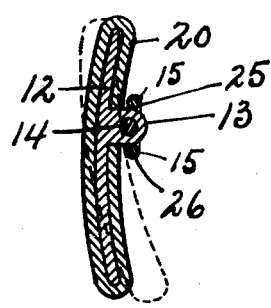
Figure 3 is a section on line 3—3, Figure 2.
Figure 4:
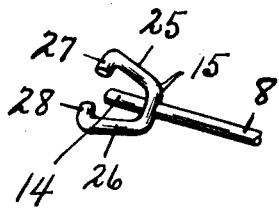
Figure 4 is a detail perspective view of the pad mounting.
Figure 5:
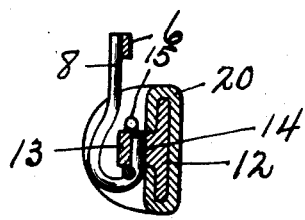
Figure 5 is a section on line 5—5, Figure 1.

Figure 1 illustrates an eye-glass or spectacle mounting comprising lens frames 1 and 2, carrying lenses 3 and 4 respectively, the frames being connected together by a bridge 5. In the pad construction illustrated, the depending arms 6 and 7 of the bridge, carry looped arms 8 and 9, which arms, in turn, carry the respective pads 10 and 11.

The particular feature of this invention resides in the structure for supporting pads 10 and 11 in a manner to permit longitudinal rocking of the pads within adjustable limits and providing for ready and easy assemblage of the pads with their supporting arms while permitting ready removal or separation of the pads from their supporting arms without damaging the supporting structure whereby new pads may be applied as desired.

The pads and their supporting means, as illustrated in the drawing, are of identical construction, and a description of one will constitute a description of both. The pad comprises an elongated plate 12 of metal, or the like, which may be longitudinally curved as desired and is bendable for that purpose. The drawing discloses the metallic plate 12 as provided with a covering 20 of zylonite, or similar suitable material, but such covering has no relation to the present invention and may be used or omitted as desired. The rear face of the plate 12 is provided with a transverse journal bearing 13 which may be formed integrally with the plate or may be secured thereto in any suitable manner.

The arm 8 may consist of a bendable wire rod of a diameter substantially the same as the internal diameter of the journal 13 so as to fit tightly therein, and the end of the arm 8 constitutes a tang 14 adapted to be rotatably mounted in the journal 13, and this tang may be considered as of the same length as the axial length of the bearing 13.

In order to secure the tang in position in the bearing 13 while permitting lengthwise rocking movement of the pad about the tang and substantially eliminating any transverse rocking movement, a boxlike structure 15 is provided which may, as shown, be formed of a single piece of wire bent into substantially square or rectangular form with the split, where the ends 27 and 28 of the wire contact with each other or are adjacent each other, preferably formed in the intermediate portion of one of these walls of the structure 15. These ends 27 and 28 may be, prior to assemblage with a pad, spread apart a distance slightly greater than the exterior diameter of the boss or bearing 13.

The side of the structure 15 opposite the side which includes the split is secured in any suitable way as by welding, soldering or the like, to the arm 8 at the base of the tang so as to limit the inward movement of the tang in entering the bearing. When the tang has been inserted in the bearing to the point as limited by the structure 15, the side walls 25 and 26 of this structure lie along the sides of the bearing 13, and it is only necessary then to bend these side walls toward each other until the ends 27 and 28 come into substantial contact, and the structure 15 then tightly encloses the bearing 13 to prevent removal of the tang 14 from the bearing.

As the structure 15 is formed of bendable material, such as metal wire, its walls are readily adapted for deflection in any desired direction with respect to the pad and bearing so as to permit independent adjustment of the extent of rocking movement of the pad about tang 14 in different directions. The device for securing and supporting the pad will be seen to resemble a buckle to a very considerable degree and the split in one side of the buckle produces a structure which is readily adjusted and lends itself to ready and easy assemblage, and in order to remove the pad from the arm 8, it is only necessary to spread the structure 15 at the split side so as to space the ends 27 and 28 apart a distance sufficient to permit withdrawal of the tang from the bearing.

Although we have shown and described a specific construction, form and relation of parts as constituting a perhaps preferred embodiment of this invention, we do not desire to restrict ourselves to the exact details of form and construction or arrangement, as various changes and modifications can be made within the scope of the appended claims.

We claim:

1. In an eye-glass mounting, a nose pad having a tubular bearing projecting rearwardly therefrom with its axis substantially parallel with the rear face of the pad transversely thereof, a supporting arm for said pad provided at its end with a substantially square frame split through one side, a tang secured to the wall of the frame adjacent the supporting arm and extending across the frame to the opposite side thereof and of a length substantially equal to the interior width of the frame, said tang being positioned in said bearing and said frame extending around and enclosing said bearing.

2. In an eye-glass mounting, a nose pad having a tubular bearing projecting rearwardly therefrom with its axis substantially parallel with the rear face of the pad transversely thereof, a supporting arm for said pad provided at its end with a substantially square frame split through the side opposite that to which the supporting arm is secured, a tang secured to the wall of the frame adjacent the supporting arm and extending across the frame to the opposite side thereof and of a length substantially equal to the interior width of the frame, said tang being positioned in said bearing and said frame extending around and enclosing said bearing.

WILLIAM E. McDONNELL.
ROMAN J. GROH, Jr.